Patented Mar. 4, 1924.

1,485,502

UNITED STATES PATENT OFFICE.

TATSUSABURO HARA, OF TOKYO, JAPAN, ASSIGNOR TO MITSUBISHI KOGYO KABUSHIKI KAISHA, OF TOYKO, JAPAN.

SYNTHETIC METHOD OF PRODUCING CYANIDES.

No Drawing. Application filed June 25, 1920. Serial No. 391,710.

*To all whom it may concern:*

Be it known that I, TATSUSABURO HARA, subject of the Emperor of Japan, Tokyo, Japan, have invented new and useful Improvements in a Synthetic Method of Producing Cyanides, of which the following is a specification.

This invention relates to an improvement in a process of synthetically manufacturing cyanides by fixing free nitrogen, and consists in soaking carbon or a carbon containing material in a solution of an iron salt such as iron chloride; in causing the solution absorbed by the same to decompose and form iron oxide; and then mixing the material with an alkali metal, an alkali metal compound such as alkali metal carbonate, or an alkaline earth metal compound, and thus manufacturing cyanides by causing nitrogen to act on the mixture at a high temperature. The object of this invention is to distribute a catalyzer uniformly and in minute particles in the structure of carbon or a carbon containing material which takes part in the reaction of producing cyanides, and to heighten the efficiency of the catalyzer, and thus to economize catalyzer and to increase the output of cyanides.

According to methods hitherto known, nitrogen is caused to act on alkali metals, or an alkali salt such as alkali metal carbonate, and carbon in the presence of a catalyzer, the reaction being $$Na_2CO_3 + 4C + N_2 = 2NaCN + 3CO$$

or $$2Na + 2C + N_2 = 2NaCN.$$

In this way alkali cyanide is manufactured. The catalyzer used in this case is metallic iron, which is mixed in the form of powder or shavings with powdered carbon and alkali metal carbonate. The mixture is kneaded adding thereto some water, dried and formed into small grains. Then, these are put in an iron receptacle and in a high temperature nitrogen is passed thereinto and the reaction is caused. Or metallic iron is put into a high power electric furnace and maintained there in molten state. Into this, carbon is thrown, and at the same time an alkali metal, in the state of vapor, and nitrogen are passed, and the reaction is caused to take place.

My invention is quite different from the processes described above. Instead of using as catalyzer metallic iron in small particles or in molten state, I soak carbon with a solution of an iron compound, and cause the iron contained therein to act as a catalyzer after being oxidized.

Thus, the efficiency of catalyzer will be heightened and the output of cyanide will be increased.

To describe my invention more fully, particles of charcoal, coke or the like are uniformly soaked in a solution of iron chloride, and after or without drying it, steam is caused to act thereon at red heat. Then reactions such as the following will take place:—

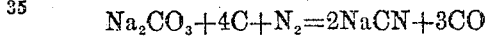
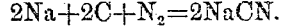

The iron chloride will be decomposed and the hydrochloric acid produced in gaseous state is condensed by any suitable method and is available as material for manufacturing iron chloride from iron ores or filings.

The hydrogen together with the carbon monoxide produced by part of the steam acting on the carbon, is available as fuel. As a matter of fact, the iron contained in the iron chloride is not reduced into metallic iron, notwithstanding that there is present a large quantity of carbon, but seems to be converted into ferrous and ferric oxides which are found mixed with a small quantity of iron oxychloride. The carbon thus treated and charged with minute particles of iron oxide within its structure is mixed with an alkali metal compound or alkaline earth metal compound, and such compound melted by heating the same at 820° to 1000° C. The compound is converted into cyanide by passing nitrogen thereinto.

The following is an example of carrying out my invention into practice:—

First, a solution of iron chloride is prepared by treating iron ore or filings with hydrochloric acid under heat. This solution is then treated with charcoal powder passed through a sieve of about 300 meshes to a square centimeter at a rate of 100 parts of the charcoal powder to 10 parts of iron contained in the iron chloride solution. The charcoal powder thus soaked with the iron chloride solution, is somewhat dried, put in a tube and is heated to red heat for one hour and a half passing steam from one end of the tube. The hydrochloric acid and other gases that issue from the other end of the tube are collected by any suitable method. The material remaining in the tube is then cooled, and taken out. On examining this material it is found that it contains 79% carbon, 11.7% iron, 0.3% chlorine, the remaining 9% being oxygen, water, etc. Mix this material with anhydrous sodium carbonate of equal weight, put the mixture in an iron tube, and subject it for one hour and a half to a heat of 950° C., passing thereinto nitrogen gas all the time, and the whole of the reaction production is then extracted by dissolving it in water. On analyzing this reaction production, it has been found that 92.3% of the sodium carbonate used is converted into sodium cyanide. The solution of sodium cyanide extracted from the reaction product is very pure, the only impurity found being a small proportion of sodium carbonate.

Instead of treating carbon with a solution of an iron salt and decomposing the iron salt by passing steam, as described above, powder of charcoal, coke or the like, soaked with aqueous solution of the iron chloride, and heated to red heat in a closed vessel without passing any steam thereinto, may be used; or the use of steam may be wholly dispensed with, and carbon powder containing an iron salt may be treated at a high temperature with carbon monoxide or a gas containing carbon monoxide (for this purpose, mixture of carbon monoxide generated in the reaction, with surplus nitrogen, may be used), thus separating iron from the salt as iron oxide. But in these methods part of the iron salt is apt to be reduced to metallic iron. Moreover, it is more difficult to separate the acid radical which forms part of the iron salt combining with iron than in the other process.

In this invention, carbon or carbon containing material soaked with an iron salt is not directly used in the manufacture of cyanide, but only after the iron salt has been wholly or partly decomposed by treatments as hereinbefore described, in order to prevent mixing of the acid radical which forms the iron salt, with the cyanide produced. Moreover, common iron salts have acid property in presence of moisture, and when mixed with an alkali metal or alkali metal carbonate, act on it and neutralizes it, thus greatly reducing the output of cyanide. Not only iron salt dissolved in water and soaked in carbon or carbon containing material, but even when it is in dry solid state, it absorbs moisture from the atmosphere while undergoing various treatments, and neutralizes alkali metal or alkali metal carbonate when mixed with it. The conversion of iron salt into an iron oxide, or other compound, which does not neutralize alkali, before mixing it therewith, is therefore an important feature of my invention.

As to iron salts to be used in this process iron chloride is best. If, iron sulphate is used, there is fear of producing more or less sulphocyanide and ferrocyanide compounds owing to sulphur remaining unvolatilized.

Also, in place of an alkali metal salt, an alkaline earth metal salt such as alkaline earth metal carbonate, or an alkaline earth metal oxide, may be used, and cyanide corresponding thereto will be obtained. But the yield is not so great and the product is not so pure as when cyanide is synthetized from alkali metal carbonate.

Whether in my invention the iron compound such as iron oxide acts as catalyzer as it is, or it is first reduced to metallic iron, by surplus carbon when the reaction of synthesizing cyanide is taking place, or by monoxide produced as result of such reaction, and acts as catalyzer in minute metallic particles, it is not certain. But it is thought probable that iron is first reduced from the iron salt and then acts as catalyzer. If this is the fact, use of an iron compound instead of metallic iron may seem a roundabout way, but the experiment proves that the former is far more advantageous than the latter. This may be explained as follows:—When iron is divided into minute particles by chemical means, its surface becomes very great, and is then very unstable and very easily oxidized, and according to the condition of the iron particles when reduced, they burn at ordinary temperature as soon as they are exposed to the atmosphere. Thus, as a catalyzer also iron may have better effect when it is in fine particles than when it is in coarser grains.

The above is an example of carrying out my invention into practice, and the proportions of materials, temperatures and time stated in connection with the various treatments may not be most advantageous ones. But according to methods hitherto used in which cyanides are synthetized from an alkali metal, or alkali metal carbonate, and carbon, using metallic iron as catalyzer, the quantity of iron to be used should be very large. Thus, unless iron remaining mixed with the reaction product, is separated, the product cannot be marketed. In my invention the proper quantity of iron chloride to be used for this purpose is from 2.5 to 10 parts of the salt contained therein to 100 parts of carbon. The quantity of iron used being very small compared with the quantity used in hitherto known methods, there is no need of separating iron from the reaction product, which can be sent to market as produced. Moreover, according to my invention, as iron is extracted from iron ore or iron containing material, with hydrochloric acid without the expense and labor of melting or pulverizing iron as in the case of using metallic iron as catalyzer, my invention can be put into practice very economically.

I claim:—

1. The process of manufacturing cyanide by passing nitrogen into contact with a catalytic substance mixed with alkali forming metal compounds at a high temperature, which catalytic substance is a carbon containing material, charged with minute particles of iron oxide prepared by soaking the carbon containing material with a solution of an iron chloride and decomposing the iron chloride with steam at a high temperature.

2. The process of manufacturing cyanides consisting in soaking a carbonaceous substance with a solution of an iron chloride, decomposing the said chloride by heating the carbonaceous substance soaked with the said solution in the presence of steam thus causing deposition of minute particles of iron oxide in the structure thereof, mixing the carbonaceous substance thus treated with an alkali earth metal compound, subjecting the mixture to a high temperature and passing nitrogen thereinto.

3. The process of manufacturing cyanides by passing nitrogen at a high temperature into contact with a catalytic substance mixed with alkaline substances, which catalytic substance is prepared by soaking carbon in a solution of iron chloride and decomposing the said iron chloride by heating with steam.

In testimony whereof I have signed my name to this specification.

TATSUSABURO IHARA.